INVENTORS:
Cecil V. Carter
John R. Carden
Robert Howe

By Herbert E. Metcalf
Their Patent Attorney

Nov. 22, 1960   C. V. CARTER ET AL   2,961,156
GRAPHICAL VECTOR COMPUTER
Filed April 18, 1955                    2 Sheets-Sheet 2
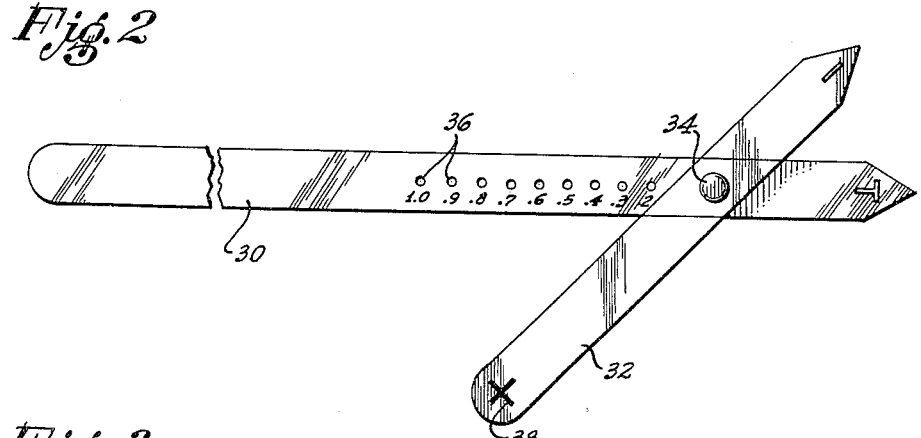
Fig. 2
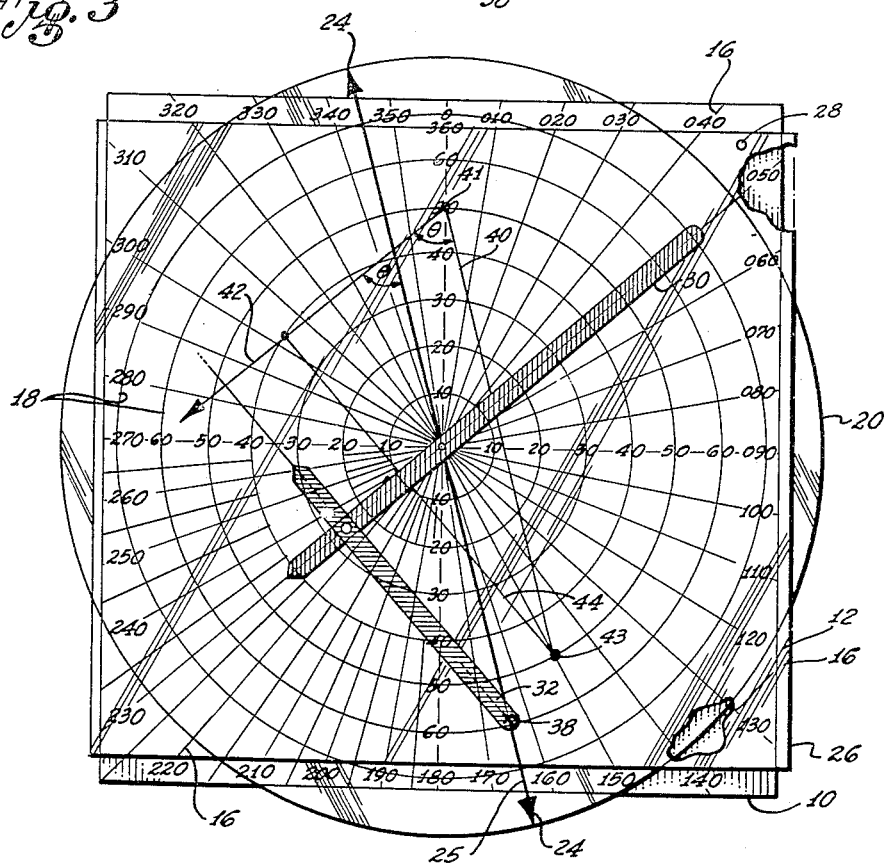
Fig. 3
INVENTORS:
Cecil V. Carter
John R. Carden
Robert Howe
Their Patent Attorney United States Patent Office 2,961,156
Patented Nov. 22, 1960

2,961,156
GRAPHICAL VECTOR COMPUTER

Cecil V. Carter, Dallas, Tex., John R. Carden, Eau Gallie, Fla., and Robert Howe, Reseda, Calif., assignors to Northrop Corporation, a corporation of California Filed Apr. 18, 1955, Ser. No. 501,972

1 Claim. (Cl. 235—61)

This invention has to do with computers and more particularly with graphical vector computers for two aircraft.

The present day high speed aircraft and air communication that enables great distances to be traversed in short intervals of time also require calculations, relative to the speed of the aircraft, to be made equal to, if not with greater speed than the aircraft where conditions so demand. Considering the case of military aircraft, it is necessary to determine as soon as is humanly possible the presence, location and direction of flight of an invader. Due to the fact that an invader is capable of covering great distances in mere moments it is necessary to determine the above facts while at the same time dispatching an interceptor aircraft in the proper direction to intercept the invader or target in the minimum amount of time.

These same conditions would prevail and beneficial results would be obtained in the case of rescue operations wherein one aircraft could be dispatched to rescue the passengers of an aircraft about to crash.

The principal object of this invention is to provide a graphical vector computer that, once a radar station or other equally applicable device locates an aircraft, direction of flight, and speed, can plot the course to be flown by another aircraft to intercept the first in the minimum of time.

Another object of this invention is to provide a graphical vector computer that comprises few structural elements, is readily fabricated, economical to manufacture and maintain.

Figure 2 is an enlarged view illustrating vector arrows and indicia.

Figure 3 is a fragmentary, schematic illustration showing the invention in the assembled condition with an intercept computation plotted.

Figure 1:
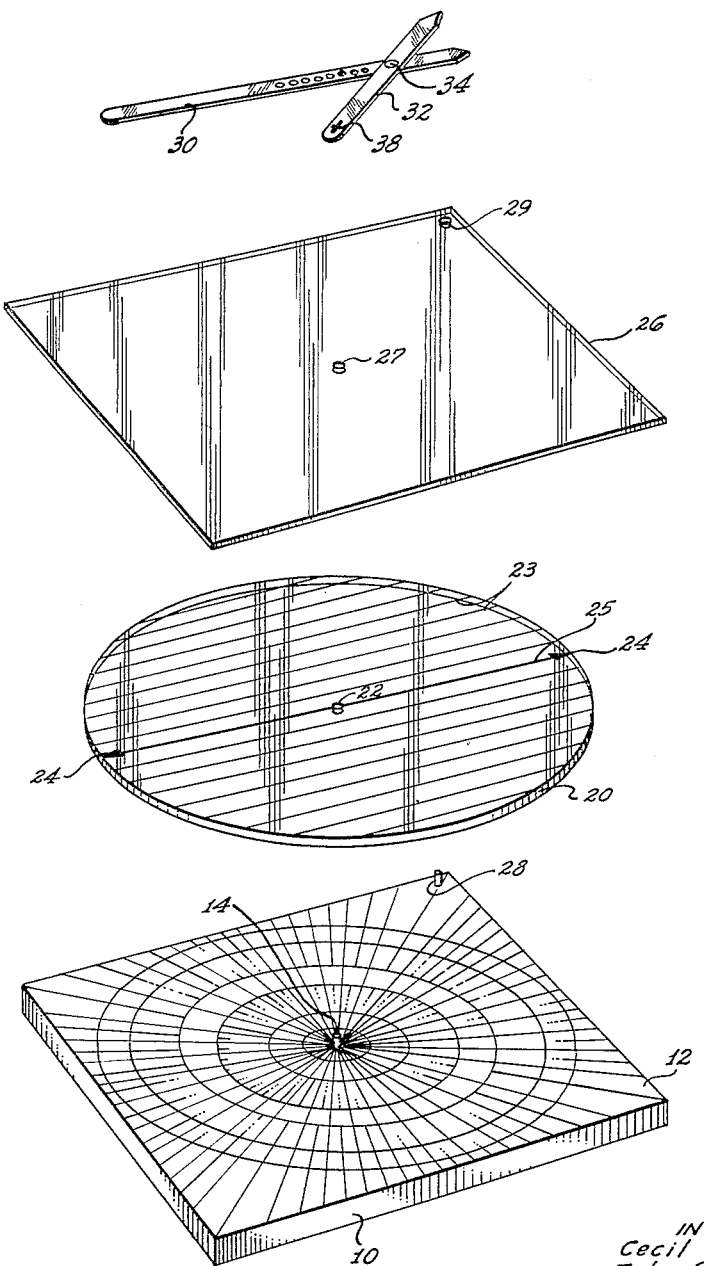
Figure 1 is an exploded view illustrating and having embodied therein the present invention.

Referring to the figures for a more detailed description of the present invention, 10 designates a panel or base having a polar chart 12 mounted thereon. The panel 10 has a pin 14 centrally located therein and projecting therefrom which designates or symbolizes a radar station. Extending from the pin or radar station are a plurality of radial lines 16 marked in degrees with true north or 360 being designated as a reference and the concentric circles 18 about the pin 14 are marked in miles.

Superimposed over the panel 10 is a circular transparent plate 20 of Plexiglas, glass or other equally applicable material. The plate has an opening 22 centrally located therein that receives pin 14 and about which the plate 20 pivots or rotates on the panel 10. Scribed thereon are a plurality of parallel lines 23, the central line 25 having scribed at each end thereof an arrow head or a directional designating Figure 24.

Overlying both the panel 10 and plate 20 is a plotting surface transparent plate 26 that also has a central opening 27 therein for receiving the pin 14. However, plate 26 is secured to panel 10 by a pin 28, on base 10, extending through an opening 29 therein and thus is prevented from rotating.

Rotatable on plate 26 and about pin 14 are a pair of vector arrows 30 and 32. Arrows 30 and 32 are also made of a transparent material and are pivotally attached to each other and rotate relative to each other in parallel planes about a pivot pin 34. A scale of $V_t/V_i$ is scribed on the long arrow 30. $V_t/V_i$ is the ratio of the target ground speed to the interceptor ground speed. In other words $V_t$ is the velocity of the target and $V_i$ is the velocity of the interceptor. Small openings 36 are drilled through arrow 30 every $0.1 V_t/V_i$ along the scale. However, more or fewer openings may be made with, of course, a resulting change in the ratio. The relationship is clearly defined by referring to arrow 32. The distance from the center of the pin 34 to the cross scribed on arrow 32 is exactly the same as that from the pin 34 to the opening designated 1.0 on the arrow 30. The pin 14 is inserted through the opening 36 corresponding to the closest ratio $V_t/V_i$ which is being used. The arrow 30 has scribed on the head end thereof a T to indicate target and arrow 32 has an I to indicate interceptor.

The operation of the device is as follows and reference is made to Figure 3 of the drawings. Certain information must be ascertained before an intercept course may be plotted to intercept the target.

The problems solved with the computer involve two moving aircraft and the compass course, which should be flown by an interceptor to collide with a moving target, is obtained from the computer. The course given is a straight line course which, if continued, should bring about a collision between interceptor and target. This course produces an intercept in the minimum of time but collision is avoided by separating the aircraft in altitude and where visibility will permit visual contact is usually made prior to actual intercept.

However, as stated certain information is required to permit a solution of the problem. The true course of the target should be known and constant; the ground speed should be known and constant; the ground speed of the interceptor should be known and constant; and the simultaneous position of the two aircraft relative to some reference point should be known. These requirements necessitate a continuous radar presentation of the position of the two aircraft relative to the station.

A solution of the problem is obtained by plotting two simultaneous positions of the target and interceptor and solving graphically for the interceptor true course. The time is the same between the target position and intercept and between the interceptor and intercept. Therefore $d_t/d_i = V_t/V_i$ where $d_t$ is the distance of the target from the point of intercept; $d_i$ is the distance of interceptor from the point of intercept. For a given $V_t/V_i$ ratio, the ratio $d_t/d_i$ is fixed. It can be seen by referring to Figure 3 that a radius $d_i$ can be drawn around the intercept point and the intercept could be effected in the same length of time from any point on the circle.

The graphical solution on the computer consists of two distinct operations: the first operation gives the intercept; the second gives the time of intercept.

It has been assumed in the construction of the computer that the interceptor speed will always exceed that of the target.

The ratio $V_t/V_i$ may be taken as the ratio of indicated airspeed with small loss of accuracy. The effect of the wind is small if the angle between the two flight paths is small.

The principal service performed by the computer is to permit the construction of two similar triangles one being imaginary, where the ratios for one will be identical to the ratios for the other. The imaginary triangle is illustrated in Figure 3.

The procedure for the solution of a problem is as follows:

Assume the radar station, designated by pin 14, has determined that a target is fifty miles therefrom and its bearing from the station is 360 degrees or due north as indicated in Figure 3. Its course is 230 degrees and speed is 250 miles an hour. Also at approximately the same moment, it is determined that the interceptor bearing from the station is 150 degrees, its speed is 500 miles an hour, and it also is 50 miles from the radar station 14. Two marks 41 and 43 are drawn on plate 26 indicating the target and interceptor positions.

The next step toward the solution of the problem is to determine the $V_t/V_i$ ratio which in this case is 0.5. Therefore arrow 30 is placed on plate 26 with the pin 14 projecting through the hole designated .5. This ratio determination reduces the function $d_t/d_i$ to equaling $V_t/V_i$ or in other words the intercept will be plotted where the interceptor will travel twice as far as the target but will arrive at the intercept point at exactly the same time. Continuing with the solution of the problem the arrow 30 is properly positioned on the pin 14 and points in the direction of the true course of flight of the target as indicated in Figure 3 of the drawings. This course of flight equals $X_t$, the as yet unsolved distance of the target from the point of intercept. Imaginary line 42 of one triangle is then established on plate 26 from the target position parallel to arrow 30 in the manner indicated in Figure 3 of the drawings. Line 42 equals $d_t$. Therefore $X_t$ equals $d_t$, but $$\frac{d_t}{d_i} \text{ equals } \frac{V_t}{V_i}$$

It may be seen that $X_t$ and $d_t$ need not be known. It may now be seen that a side of two similar triangles, one being imaginary, has been established with the arrow 30 and line 42 being a directional vector for the target but the magnitude of the vector has not been established as yet.

Plate 20 is rotated about pin 14 until the parallel lines scribed thereon are parallel to an imaginary line 40 between target and interceptor position 41 and 43. Angle $\theta$ defined by central line 25 and imaginary line 42, has now been determined and a second side of two similar triangles, one being imaginary have been established. Determining line 40 and angle $\theta$ actually determines the course to be flown by the interceptor. Once the line 40 and angle $\theta$ are known, $d_t$, $d_i$, the time to intercept and the angle between the collision paths are fixed.

The next step to solution of the problem is to rotate arrow 32 until the cross 38 thereon overlies the line 25 on plate 20, as indicated in Figure 3 of the drawings. The cross 38 should lie on the same side of the long arrow 30 as the interceptor position relative to the target. This last act with the small arrow 32 establishes the third side of one triangle and by projecting an imaginary line 44 on plate 26 parallel to it the third side of the physical triangle for the aircraft has been established. The course of flight established by arrow 32 and imaginary line 44 equals $X_i$. But $X_i$ equals $d_i$ and $$\frac{d_t}{d_i} \text{ equals } \frac{V_t}{V_i}$$

The arrow 32 and imaginary line 44 are the vector lines for the interceptor and they determine the direction and magnitude of the interceptor vector. Therefore, it has been determined that the interceptor must fly a course approximately 318° from its position to intercept the target where imaginary lines 42 and 44 intersect. The intersecting of the lines 42 and 44 establishes the magnitude of the vector represented by imaginary line 42 and arrow 30. However, to read the true course the interceptor must assume to intersect the target, plate 20 may be rotated until the scribed lines thereon are parallel to the short arrow 32 and the imaginary line 44. This is the first operation of the solution to the problem.

The last operation is to determine the time of intercept. This is done by determining the distance in miles between the interceptor position and the point of intercept and dividing by the ground speed of the interceptor.

While in order to comply with the statue, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

A graphical vector computer comprising a polar chart that represents an area upon which the relative positions and course of a first and second moving aircraft is plotted with reference to each other and a reference point; a pin centrally located in the polar chart represents a reference point; a transparent plate having parallel lines thereon and a pin receiving opening centrally located therein is superposed and rotatable on said chart; said plate having indicia thereon that is rotated into position parallel to the relative position of the two aircraft and represents one side of a triangle; a first transparent vector arrow, having a plurality of pin receiving openings therein that represent the velocity ratio between the two aircraft; said arrow being superposed and rotatable on said plate and provides the second side of said triangle; indicia on said vector arrow that represents the numerical velocity ratio between said first and second aircraft; a second transparent vector arrow rotatably connected to said first arrow and having indicia thereon; said second arrow being rotated until the indicia thereon is superposed on said plate resulting in said second arrow representing the third side of said triangle and the course required to be flown by said second aircraft to intercept the first.

References Cited in the file of this patent

UNITED STATES PATENTS

| 2,408,357 | Wolfe | Sept. 24, 1946 |
| 2,689,083 | Hammond | Sept. 14, 1954 |
| 2,703,677 | Harnwell | Mar. 8, 1955 |
| 2,767,913 | Mitchell | Oct. 23, 1956 |
| 2,799,538 | Shanhouse | Jan. 29, 1957 |

FOREIGN PATENTS

| 247,868 | Germany | June 8, 1912 |
| 135,585 | Great Britain | Nov. 26, 1919 |